(No Model.) 2 Sheets—Sheet 1.
J. FERGEN & J. T. MACWHINNIE.
CASTRATION ECRASEUR.
No. 437,148. Patented Sept. 23, 1890.
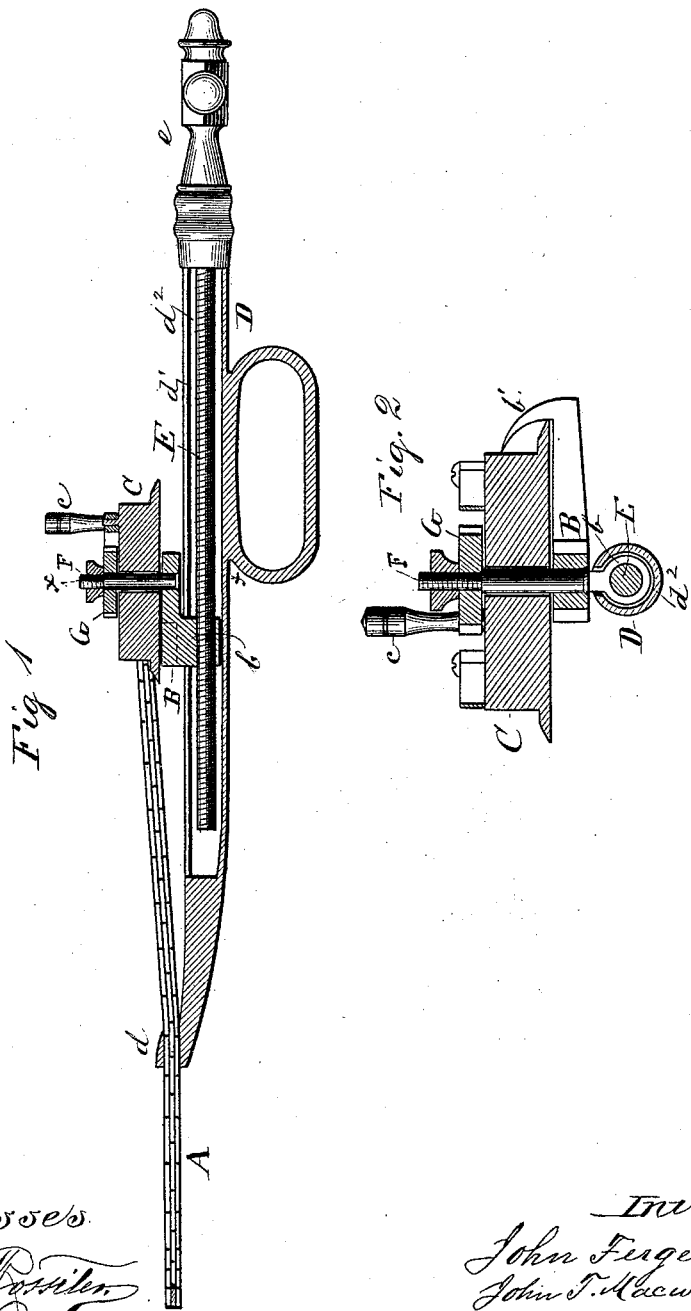
Witnesses
W. Rossiter
Otto Luebkert
Inventors
John Fergen
John T. Macwhinnie
By Wm. C. Lotz
Atty.

(No Model.) 2 Sheets—Sheet 2.
J. FERGEN & J. T. MACWHINNIE.
CASTRATION ECRASEUR.
No. 437,148. Patented Sept. 23, 1890.
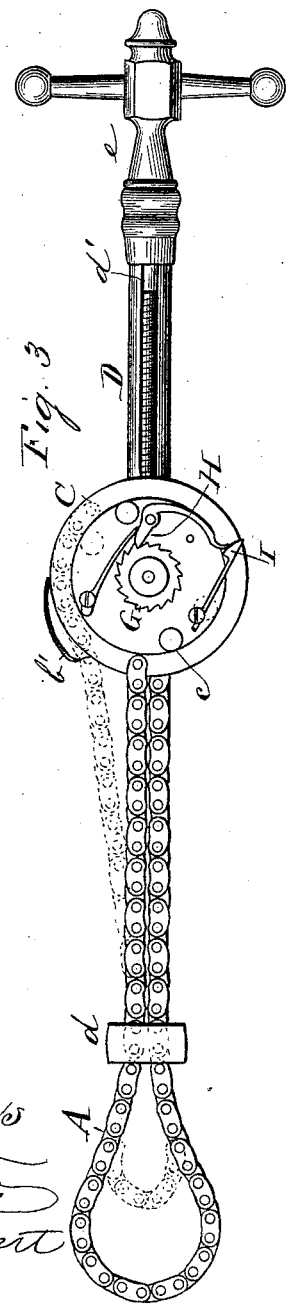
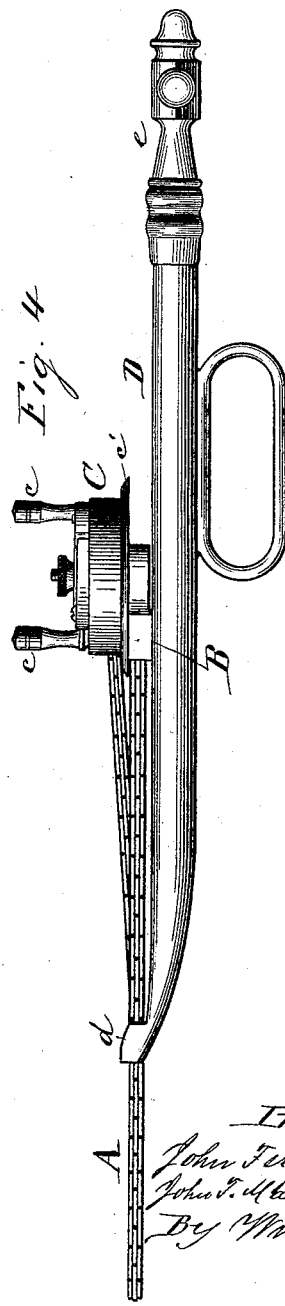

UNITED STATES PATENT OFFICE.

JOHN FERGEN AND JOHN T. MACWHINNIE, OF CHICAGO, ILLINOIS, ASSIGNORS TO THE FERGEN SURGICAL INSTRUMENT COMPANY, OF SAME PLACE.

CASTRATION-ECRASEUR.

SPECIFICATION forming part of Letters Patent No. 437,148, dated September 23, 1890.

Application filed December 10, 1889. Serial No. 333,270. (No model.)

*To all whom it may concern:*

Be it known that we, JOHN FERGEN, a subject of the Emperor of Germany, and JOHN T. MACWHINNIE, a subject of the Queen of Great Britain, both residing at Chicago, in the county of Cook and State of Illinois, have invented certain new and useful Improvements in Castration-Ecraseurs, of which the following is a specification, reference being had therein to the accompanying drawings.

Our invention relates to gelding devices involving a ligature which is attached at its ends to an adjustable holder and passed through an eye at one end of the instrument, so that by adjusting the holder in a direction away from the eye the loop which is formed by the portion of the ligature that is beyond the eye can be contracted and drawn tight about the spermatic cord of the animal.

The object of our invention is to facilitate the operation of contracting the loop up to the point where forcible contraction thereof becomes necessary; and to the attainment of the foregoing and other useful ends our invention consists in matters hereinafter set forth, and particularly pointed out in the claims.

In the accompanying drawings, Figure 1 is a central longitudinal section through a device embodying our invention. Fig. 2 is a transverse section on line $x$ $x$. Fig. 3 is a plan, and Fig. 4 is a side view.

In said drawings, A indicates the band or ligature, which can be formed of links or constructed in any other ordinary or suitable way. The adjustable holder for the ends of the ligature comprises two members B and C, which are susceptible of a common adjustment along the stem D of the instrument, while, on the other hand, the member C is susceptible of a rotary adjustment independently of the member B. The ligature passes through an eye $d$ at the forward end of the stem D, so that the loop formed by the portion of the ligature which is beyond said eye can be contracted by drawing the ligature back through the eye.

The part or member B of the ligature-holder slides upon the stem and is formed with a nut $b$, which projects through a slot $d'$ into the longitudinal bore $d^2$ of the stem, wherein said nut is engaged by an adjusting-screw E. Said screw has a handle $e$, so that it can be turned for the purpose of adjusting the holder.

The rotary adjustable member C of the holder is held by a pivot F upon the sliding member B, and is provided with one or more handles $c$, by which it can be readily turned. The pivot F is fixed upon the sliding member B, and is provided with a ratchet G. The rotary adjustable member C carries a spring-controlled pawl H, which can be locked out of engagement with the ratchet by a catch I, or released from said catch and permitted to engage the pawl so as to allow the rotary member C to be turned in a direction to unwind such portion of the ligature as may have been wound thereon. To permit such winding of the ligature on member C, the latter is adapted to serve as a winding-drum. The member B is also provided with a guard $b'$, which is arranged to prevent the ligature from slipping off a base-flange $c'$, with which said winding member of the holder is provided.

By the foregoing arrangement the member C can be first turned so as to rapidly wind the ligature thereon, and thereby bring the loop in the ligature to the desired size, after which the loop can be drawn still smaller, and hence tightened upon the part to be operated upon by the more slowly-acting but more forcible operation of the adjusting-screw.

What we claim as our invention is—

1. In a gelding device, the combination, with the slotted tubular stem D, the screw E, nut-plate B, and the ligature A, passed through an eye at the end of stem D and secured with one end to nut-plate B, of spool C, pivotally secured upon nut-plate B, with the other end of the ligature A coupled to wind upon such spool C, and with a suitable locking device for such spool, all substantially as set forth.

2. In a gelding device, the combination of the slotted stem D, the screw E, provided with handle $e$, the sliding plate B, with nut $b$, and the ligature A, passed through an eye $d$ of stem D and secured with one end to plate B and with its opposite end to a spool C, pivotally secured upon plate B and provided with crank c and pawl H, engaging ratchet-wheel G, all substantially as set forth.

3. In a gelding device, the combination, with the sliding plate B of the ligature-holder longitudinally adjustable by a screw and provided with guard b', of the spool C of the ligature-holder, pivotally secured upon plate B and having flange c', substantially as set forth.

In testimony whereof we affix our signatures in presence of two witnesses.

JOHN FERGEN.
JOHN T. MACWHINNIE.

Witnesses:
WILLIAM H. LOTZ,
OTTO LEUBKERT.